T. THORNBURG.
WATER BACK FOR FURNACES.
APPLICATION FILED JAN. 25, 1909.

929,899.

Patented Aug. 3, 1909.
2 SHEETS—SHEET 1.

Witnesses
Rose S. Johnson
Fannie Jacobs

Inventor
Thomas Thornburg
By Walton E. Coleman
Attorney

T. THORNBURG.
WATER BACK FOR FURNACES.
APPLICATION FILED JAN. 25, 1909.

929,899.

Patented Aug. 3, 1909.
2 SHEETS—SHEET 2.

Witnesses
Rose S. Johnson
Fannie Jacobs

Inventor
Thomas Thornburg
By Watson E. Coleman
Attorney

UNITED STATES PATENT OFFICE.

THOMAS THORNBURG, OF HAMMOND, INDIANA.

WATER-BACK FOR FURNACES.

No. 929,899.  Specification of Letters Patent.  Patented Aug. 3, 1909.

Application filed January 25, 1909. Serial No. 474,137.

*To all whom it may concern:*

Be it known that I, THOMAS THORNBURG, a citizen of the United States, residing at Hammond, in the county of Lake and State of Indiana, have invented certain new and useful Improvements in Water-Backs for Furnaces, of which the following is a specification, reference being had to the accompanying drawings.

This invention is an improved water back for furnaces of all kinds and particularly those used for melting glass, roasting ores and the like.

The object of the invention is to provide a simple, practical and efficient water back which will effectively protect the lining of a furnace and thereby lengthen the life of the same, which will allow for the expansion and contraction of the furnace walls under changes of temperature and which may be quickly and effectively cleaned out.

With the above and other objects in view, the invention consists of the novel features of construction and the combination and arrangement of parts hereinafter fully described and claimed, and illustrated in the accompanying drawings, in which—

Figure 1:
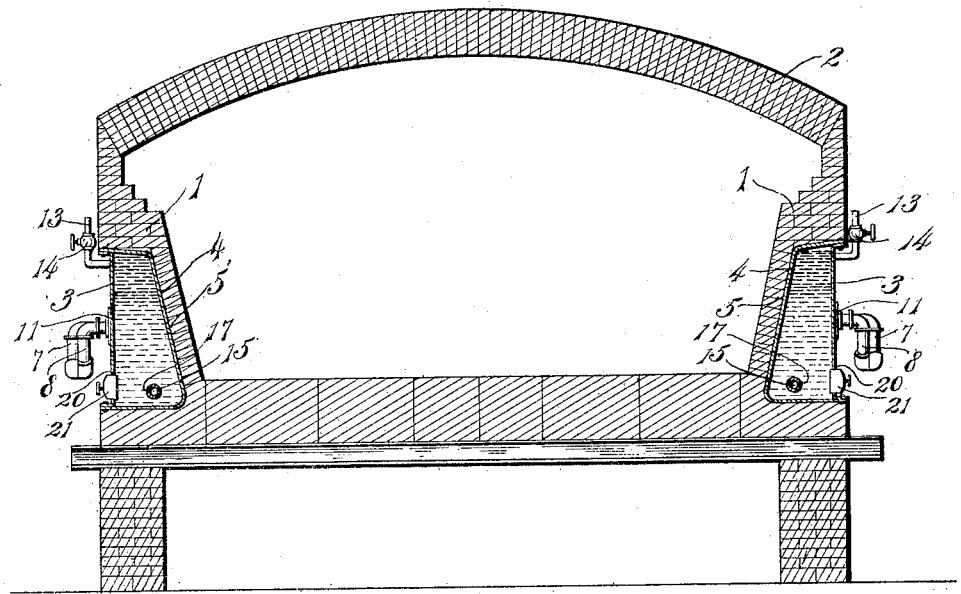
Figure 4:
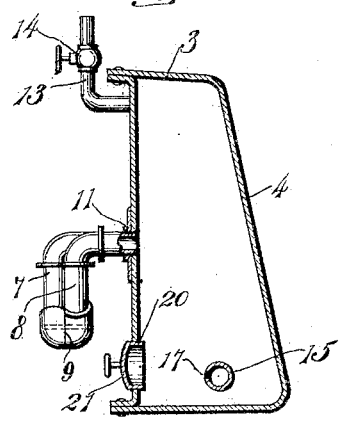
Figure 5:
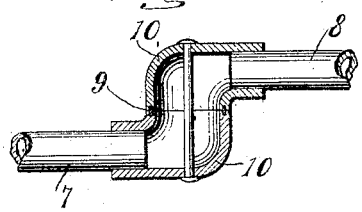
Figure 2:
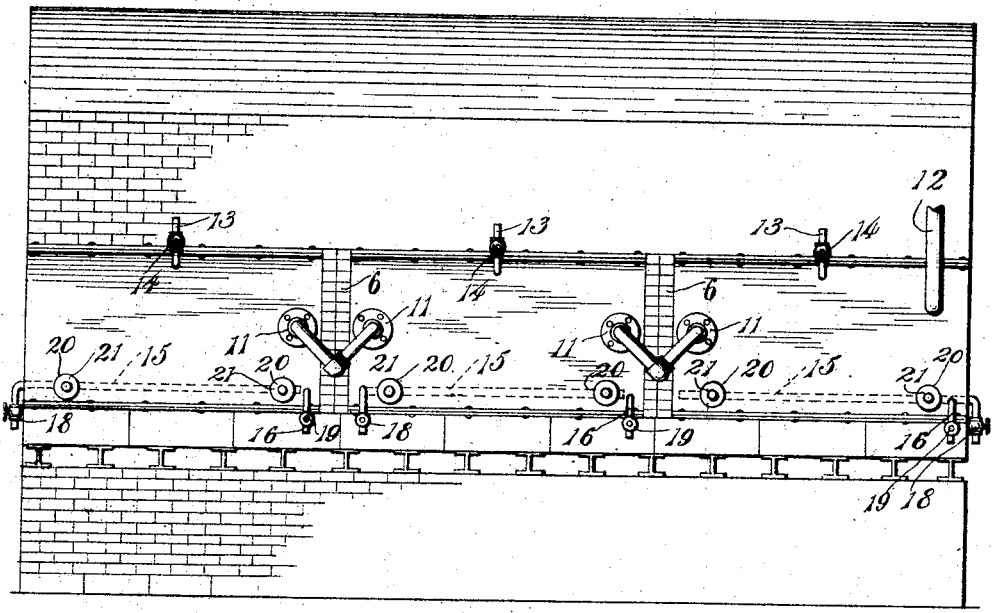
Figure 3:
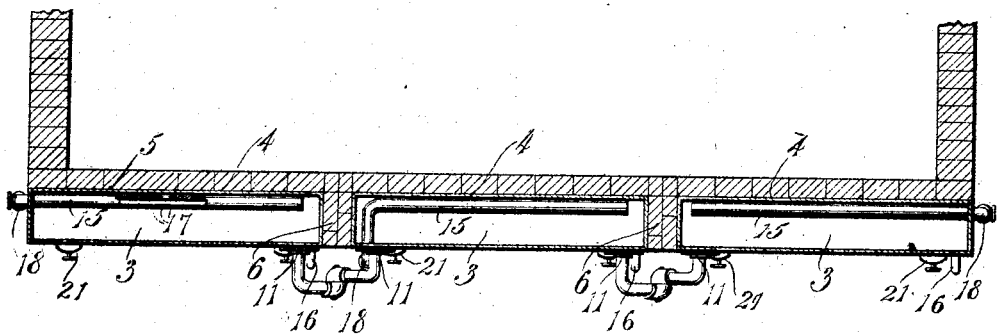

Figure 1 is a vertical cross sectional view through a glass furnace showing the improved water back applied thereto; Fig. 2 is a side elevation of the furnace; Fig. 3 is a horizontal section; Fig. 4 is an enlarged cross sectional view through one of the members or sections of the water back; and Fig. 5 is a detail sectional view through the swinging expansion and contraction joints of the pipe connections uniting the several water back sections.

While the invention may be embodied in a furnace of any description and in any part of such furnace, it is illustrated in the drawings as mounted in the side walls 1 of a well known type of glass furnace 2.

The invention is duplicated on the two sides of the furnace and hence a description of the structure on one side will suffice for both.

The invention consists of two or more water back members or sections 3, each of which is preferably constructed of sheet metal, as shown more clearly in Fig. 4, and is of substantially rectangular shape in cross section, its inner wall 4, however, being inclined upwardly and outwardly so that the fire bricks or other lining 5 of the furnace wall 1 will lie against and be supported by said wall 4. To further strengthen the wall 1 and more effectively unite the portions of its lining 5 opposite the several water back sections 3, the latter are arranged in spaced relation, as shown in Figs. 2 and 3 of the drawings, so that the brick work or masonry 6 between said water back sections will act as bonds or ties to hold the lining and brick work of the wall together.

The several water back sections 3 are in communication with each other through connecting pipe sections 7, 8 and to allow for the movement of the water back sections with respect to each other during the expansion and contraction of the wall under variations in temperature, the pipe sections 7, 8 are made angular and screwed into the adjacent water back sections and united by a suitable joint 9. Said pipe sections 7, 8 are disposed in angular relation, their adjacent ends carrying the pivoted members 10 of the joint 9 and their opposite ends being connected to and in communication with adjacent water back sections, as shown at 11.

Water is introduced into the several water back sections 3 through a supply pipe 12 connected to one of said sections and each of the latter is provided with a vent or overflow pipe 13 which may contain a globe valve 14, a safety valve or any other suitable valve. These valves allow the air and steam accumulating in the water back sections to escape.

For the purpose of removing sediment, scale and dirt from the water back sections, each of them is provided with a cleaning means consisting of an air blast pipe 15 and a drain pipe 16. The pipe 15 extends longitudinally through the water back section adjacent to its bottom and is formed with one or more rows of perforations 17 to permit of the escape of air blasts which will thoroughly agitate the sediment and dirt upon the bottom of the section. A suitable controlling valve 18 is arranged in the outer portion of the air blast pipe 15. The drain or waste pipe 16 is in communication with the lower portion of the water back sections and is also provided with a suitable cutoff or controlling valve 19.

20 denotes hand holes formed in the outer wall of each of the water back sections adjacent to their lower corners and closed by suitable removable covers 21. When the latter are removed the collected dirt which cannot be removed through the drain pipe 16, may be taken out of the water back sections.

Having thus described the invention what is claimed is:

1. The combination of a furnace wall of masonry, a lining for said wall, a plurality of water back sections set in said wall in spaced relation, and bonds of masonry between the water back sections to unite the portions of the wall and its lining and retain the latter against the water back sections.

2. The combination of a furnace wall of masonry, a lining for said wall, a plurality of water back sections set in said wall in spaced relation, bonds of masonry between the water back sections to unite the different portions of the wall and its lining and retain the latter against the water back sections, and pipe connections between the adjacent water back sections having swinging and jointed pipe sections to permit the water back sections to move toward and from each other in the contraction and expansion of the furnace wall.

3. The combination of a furnace wall, water back sections arranged therein, pipe connections between adjacent water back sections, each of said pipe connections consisting of two angular pipes, each having one of its ends threaded or tapped into one of the water back sections and a joint uniting the other ends of said pipes and composed of pivoted members.

4. The combination of a furnace wall, a water back arranged therein, a valve controlled drain pipe in communication with the water back adjacent its bottom and a valve controlled perforated air blast pipe extending through the water back adjacent to its bottom for discharging air blasts into the water back to agitate the sediment and dirt therein.

5. The combination of a furnace wall, a water back arranged therein and having an outlet and means arranged within the water back adjacent its bottom for agitating the sediment and dirt therein.

In testimony whereof I hereunto affix my signature in the presence of two witnesses.

THOS. THORNBURG.

Witnesses:
J. G. IBACH,
JESSIE THORNBURG.